United States Patent
Kim et al.

(10) Patent No.: US 8,310,480 B2
(45) Date of Patent: Nov. 13, 2012

(54) METHOD, MEDIUM, AND SYSTEM FOR COMPRESSING AND DECODING MESH DATA IN THREE-DIMENSIONAL MESH MODEL

(75) Inventors: Ho-Kyung Kim, Seongnam-si (KR); Seung-Yong Lee, Pohang-si (KR); Jong-Seok Lee, Seoul (KR); Sung-Yul Choe, Basan (KR)

(73) Assignees: Samsung Electronics Co., Ltd., Suwon-Si (KR); Postech Academy-Industry Foundation, Pohang-Si (KR)

( * ) Notice: Subject to any disclaimer, the term of this patent is extended or adjusted under 35 U.S.C. 154(b) by 946 days.

(21) Appl. No.: 12/320,068

(22) Filed: Jan. 15, 2009

(65) Prior Publication Data

US 2009/0184956 A1 Jul. 23, 2009

(30) Foreign Application Priority Data

Jan. 21, 2008 (KR) .................. 10-2008-0006347

(51) Int. Cl.
*G06T 15/00* (2011.01)

(52) U.S. Cl. ...................................... 345/419; 345/420

(58) Field of Classification Search ............... 345/419, 345/420
See application file for complete search history.

(56) References Cited

U.S. PATENT DOCUMENTS

| | | | |
|---|---|---|---|
| 6,222,553 B1 * | 4/2001 | DeRose et al. | 345/423 |
| 6,553,337 B1 * | 4/2003 | Lounsbery | 703/2 |
| 6,850,638 B1 * | 2/2005 | Lounsbery | 382/154 |
| 8,006,236 B1 * | 8/2011 | Kilgard et al. | 717/136 |

FOREIGN PATENT DOCUMENTS

| | | |
|---|---|---|
| JP | 2002-8060 | 1/2002 |
| KR | 2001-0008944 | 2/2001 |
| KR | 10-2004-0096209 | 11/2004 |

OTHER PUBLICATIONS

Hardware-Compatible Vertex Compresison Using Quantization and Simplification, Purnomo et al., The Eurographics Association, 2005.
Gabriel Taubin, et al., "Geometric Compression Through Topological Surgery", ACM Transactions on Graphics, vol. 17, No. 2, Apr. 1998, pp. 84-115.

* cited by examiner

*Primary Examiner* — Jeffrey Chow
(74) *Attorney, Agent, or Firm* — Staas & Halsey LLP (57) ABSTRACT

A method, medium, and system for compressing and decoding mesh data in a three-dimensional mesh model is provided. The system for compressing and decoding mesh data in a three-dimensional mesh model includes a mesh data acquisition unit acquiring mesh data from a three-dimensional mesh model, a cluster mesh generation unit generating a plurality of cluster meshes by using the mesh data, and a local quantization unit quantizing geometry information of respective vertexes through application of respective local coordinate systems to the respective cluster meshes and generating quantized data of the respective vertexes included in the respective cluster meshes.

22 Claims, 9 Drawing Sheets

METHOD, MEDIUM, AND SYSTEM FOR COMPRESSING AND DECODING MESH DATA IN THREE-DIMENSIONAL MESH MODEL

CROSS-REFERENCE TO RELATED APPLICATIONS

This application is based on and claims priority benefit from Korean Patent Application No. 10-2008-0006347, filed on Jan. 21, 2008, in the Korean Intellectual Property Office, the disclosure of which is incorporated herein in its entirety by reference.

BACKGROUND

1. Field

Embodiments relate to a method, medium, and system for compressing and decoding mesh data in a three-dimensional mesh model, and more particularly, to a method, medium, and system for compressing and decoding geometry data of respective vertexes in a three-dimensional mesh model.

2. Description of the Related Art

Three-dimensional mesh data processing and displaying technology can be applied to diverse fields, such as CAD (Computer Aided Design), computer graphics, computer games, virtual reality, medical images, and the like, using mesh data composed of geometry information of vertexes constituting meshes and connectivity information among the vertexes.

Diverse methods of compressing and decoding such three-dimensional mesh data have been proposed. For example, "G. Taubin and J. Rossignac, *Geometry Compression Through Topological Surgery, ACM Transactions on Graphics*, Vol. 17, No. 2, 84-115p, 1998" shows great concern in the improvement of a compression rate of three-dimensional mesh data.

Recently, as wireless network environments attain maturity with the development of mobile communication network, it is on an increasing trend to make efficient use of diverse applications through a portable phone or a portable communication device. Such a portable phone or portable device, however, may be relatively inferior in capacity of a main storage and operation capability in comparison to a large-capacity personal computer (PC) or server.

Accordingly, there is a need for a method and system capable of compressing and decoding three-dimensional mesh data even with relatively low operation capability and memory capacity.

SUMMARY

Accordingly, embodiments have been made to solve the above-mentioned problems occurring in the prior art, and embodiments provide a method, medium, and system capable of compressing and decoding geometry data of respective vertexes by using grouped meshes in a three-dimensional mesh model.

Embodiments provide a method, medium, and system capable of storing good quality quantized data through local quantization based on a local coordinate system in order to reduce an error of geometry data indicating positions of respective vertexes.

Embodiments provide a method, medium, and system capable of decoding compressed vertex data in real time in a graphic processing device.

Additional aspects of embodiments will be set forth in part in the description which follows and in part will become apparent to those having ordinary skill in the art upon examination of the following or may be learned from practice of the invention.

In an aspect of embodiments, there is provided a system for compressing and decoding mesh data in a three-dimensional mesh model, which includes a mesh data acquisition unit to acquire mesh data from a three-dimensional mesh model; a cluster mesh generation unit to generate a plurality of cluster meshes by using the mesh data; and a local quantization unit to quantize geometry information of respective vertexes through application of respective local coordinate systems to the respective cluster meshes and to generate quantized data of the respective vertexes included in the respective cluster meshes.

In an aspect of embodiments, there is provided a method of compressing and decoding mesh data in a three-dimensional mesh model, which includes acquiring mesh data from a three-dimensional mesh model; generating a plurality of cluster meshes by using the mesh data; and quantizing geometry information of respective vertexes through application of respective local coordinate systems to the respective cluster meshes and generating quantized data of the respective vertexes included in the respective cluster meshes, wherein the method is performed using at least one processor.

In an aspect of embodiments, there is provided at least one computer readable medium storing computer readable instructions to implement methods of embodiments.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below by referring to the figures.

Embodiments will be described herein with reference to the accompanying drawings illustrating block diagrams and flowcharts for explaining a method and system for compressing and decoding mesh data in a three-dimensional mesh model according to embodiments. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, which implements the functions specified in the flowchart block or blocks. These computer program instructions may also be provided to a plurality of processor, computers, or other programmable data processing apparatuses which form a distributed network, so that the computer program instructions are stored and executed in a distributed fashion.

The computer program instructions can be recorded in/on a medium/media in a variety of ways, with examples of the medium/media including recording media such as magnetic storage media (e.g., floppy disks, hard disks, magnetic tapes, etc.), optical media (e.g., CD-ROMs, DVDs, etc.), magneto-optical media (e.g., floptical disks), and hardware storage devices (e.g., read only memory media, random access memory media, flash memories, etc.). The medium/media may also be stored in a distributed network formed by a plurality of computers, processors, or other programmable data processing apparatuses, so that the computer program instructions are stored and executed in a distributed fashion.

These computer program instructions may also be stored in a computer usable or computer-readable memory that can direct a computer or other programmable data processing apparatus to function in a particular manner, such that the instructions stored in the computer usable or computer-readable memory produce an article of manufacture, which implements the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Also, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In embodiments, the term "unit", as used herein, may be implemented as a kind of module. Here, the term "module" denotes, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

Hereinafter, embodiments will be described in detail with reference to the attached drawings.

Figure 1:
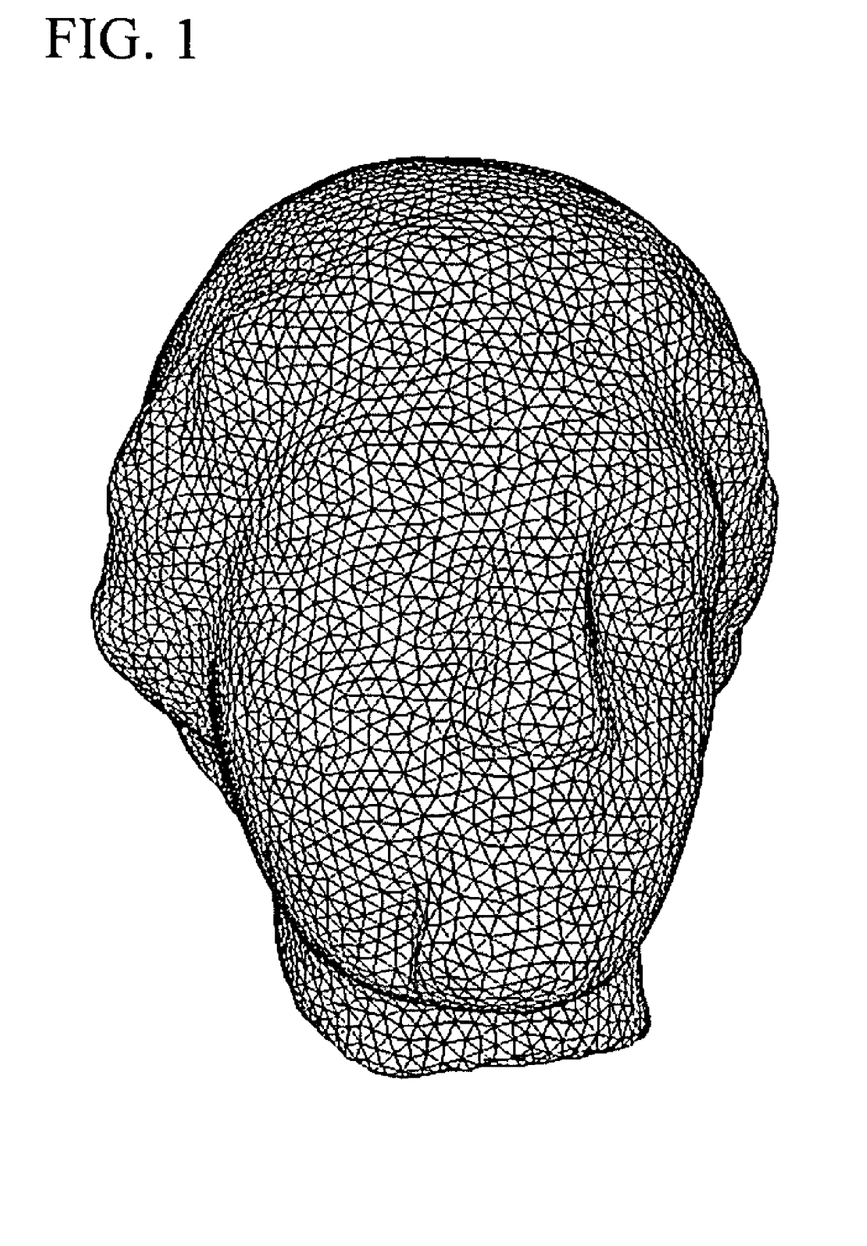
FIG. 1 is a view illustrating an example of mesh generation in a general three-dimensional model.
Figure 2:
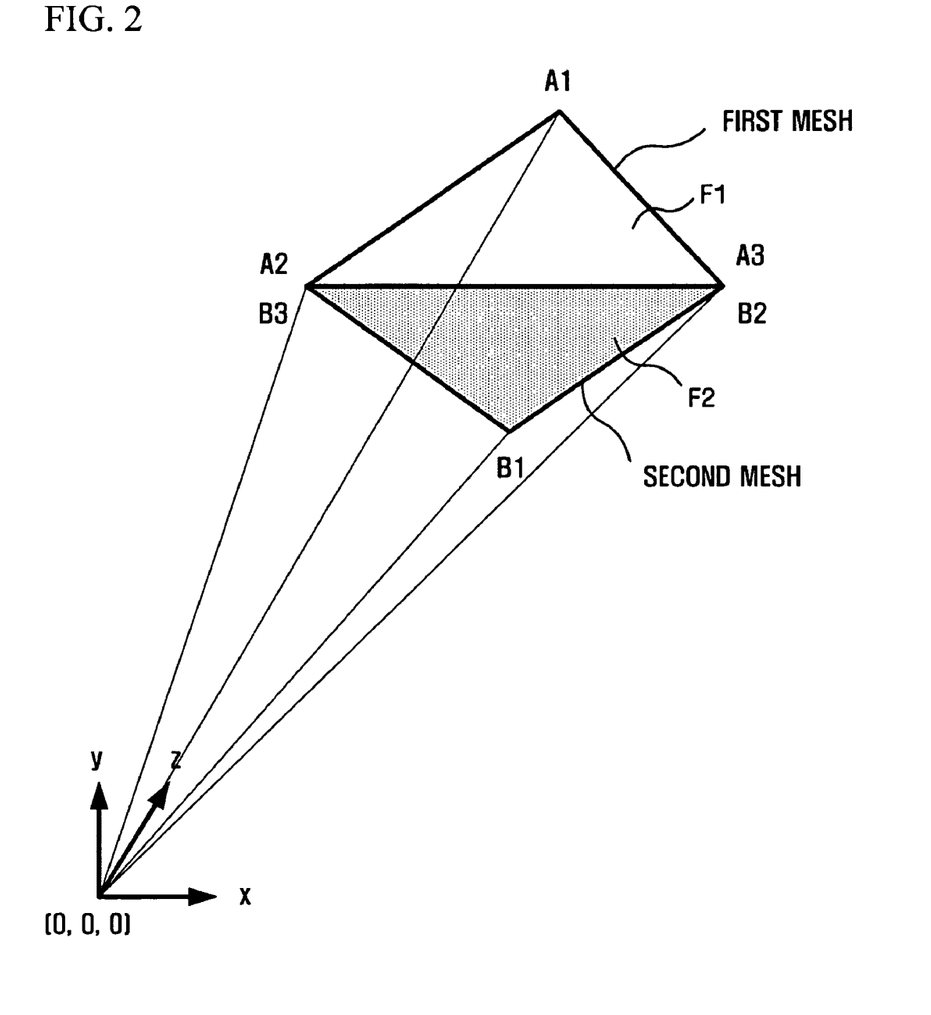
FIG. 2 is a view illustrating a coordinate system and mesh data in a general three-dimensional model.

FIG. 1 is a view illustrating an example of mesh generation in a general three-dimensional model, and FIG. 2 is a view illustrating a,coordinate system and mesh data in a general three-dimensional model.

Referring to FIG. 1, a plurality of meshes may be generated with respect to a three-dimensionally modeled character shape. Polygonal meshes are generated with respect to a face that forms a surface of the three-dimensional character shape. Here, a mesh has a closed structure composed of faces, vertexes, and edges. For example, the mesh may be in the form of a triangle, a tetragon, a pentagon, or the like.

Once the size or area of the mesh as described above is given, several tens to several ten thousands of meshes are automatically formed in accordance with a modeled shape. In generating the meshes, techniques already known in the field of modeling a three-dimensional shape Referring to FIG. 2, mesh data of two triangular meshes can be determined using an absolute coordinate system. Here, the mesh data includes information capable of expressing a mesh composed of faces, vertexes, and edges. For example, the mesh data includes coordinates of the respective vertexes for one mesh, and if the coordinates of the respective vertexes are known, a three-dimensional mesh model can be displayed on a display screen from different viewpoints with reference to the coordinates of the respective vertexes.

The mesh data includes geometry information of the respective vertexes. For example, the first mesh may include three vertexes A1, A2, and A3, and the second mesh may include vertexes of B1, B2, and B3. Here, the vertex A2 is the same as the vertex B3, and the vertex A3 is the same as the vertex B2. The order of the vertexes may be designated clockwise or counterclockwise in accordance with the order of counting. Accordingly, if it is possible to accurately express and store the positions of the respective vertexes, the mesh data can be accurately decoded using the positions of the vertexes. On the other hand, a line connecting two neighboring vertexes may be considered as an edge. Accordingly, a triangular mesh includes three edges.

As another example of mesh data, a face may be designated, and vertexes included in the face may be designated. For example, a face F1 includes vertexes A1, A2, and A3, and a face F2 includes vertexes B1, B2, and B3.

As still another example of mesh data, geometry information of respective vertexes and connectivity information among the vertexes may be used as mesh data. In addition, the geometry information of the respective vertexes may be called vertex data.

On the other hand, in calculating the positions of the respective vertexes after a plurality of meshes are generated, an absolute coordinate system as shown in FIG. 1 may be used. In calculating the positions of the respective vertexes around the original position (0, 0, 0) of the absolute coordinate system, absolute values of coordinates of the respective vertexes are increased as the distance from the original point becomes longer. The geometry information of a general vertex may be given as a real number during modeling of a three-dimensional shape, but may be displayed on an output display screen in the form of an integer. However, as the distance from the original point becomes longer, it is required to increase the number of bits for defining the size of an integer. If the number of bits for expressing the integer is fixed, the accuracy of the coordinate position of the vertex spread at a long distance, which is expressed by the integer, may be lowered.

Figure 3:
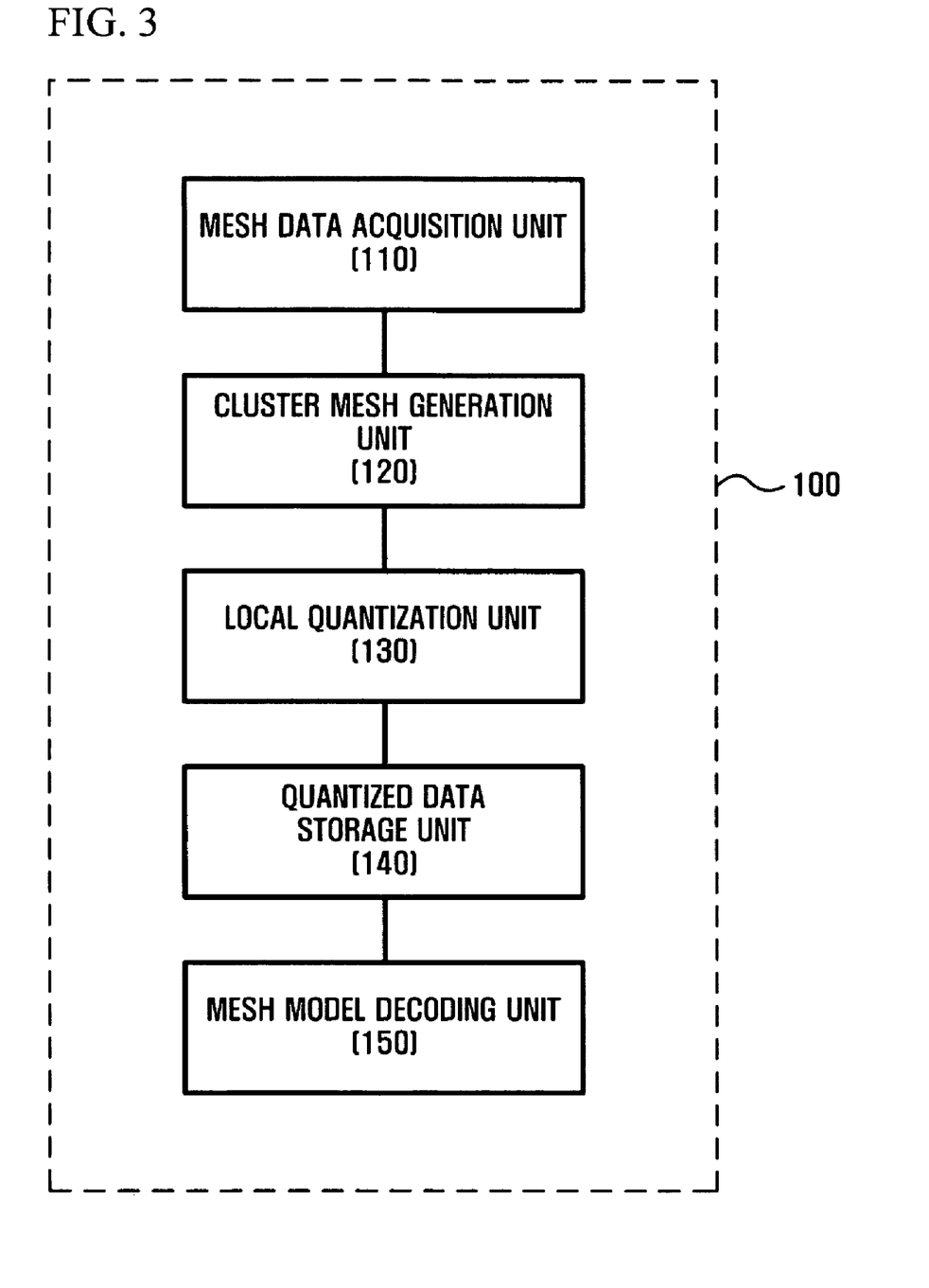
FIG. 3 is a block diagram illustrating the configuration of a system for compressing and decoding three-dimensional mesh data according to an embodiment.

FIG. 3 is a block diagram illustrating the configuration of a system for compressing and decoding three-dimensional mesh data according to an embodiment.

Referring to FIG. 3, a system 100 for compressing and decoding mesh data in a three-dimensional mesh model according to an embodiment includes a mesh data acquisition unit 110, a cluster mesh generation unit 120, a local quantization unit 130, and a quantized data storage unit 140.

The mesh data acquisition unit 110 acquires mesh data of meshes generated from a three-dimensional mesh model. Also, the mesh data acquisition unit 110 reads and acquires mesh data stored in a storage medium (not illustrated). Here, the mesh data includes geometry information of vertexes of meshes generated from the three-dimensional mesh model. The shape of the whole three-dimensional mesh model is expressed by using positions of the respective vertexes as values expressed in the absolute coordinate system.

The mesh data acquisition unit 110 acquires mesh data acquires the mesh data of the respective meshes by generating a three-dimensional mesh model through a three-dimensional scanning method, or acquires the mesh data from the three-dimensional mesh model generated based on the three-dimensional modeling.

The cluster mesh generation unit generates cluster meshes by using the acquired mesh data. Here, the cluster mesh denotes a set of meshes which neighbor one another and can be recognized as a fragment. Also, the cluster mesh is a mesh generated by combining neighboring meshes, and can neighbor another cluster mesh by a plurality of edges. In an embodiment, by calculating positions of the respective vertexes included in a cluster mesh based on a local coordinate system, the positions of the respective vertexes can be accurately expressed by a relatively small number of bits.

The local quantization unit 130 quantizes the respective cluster meshes by using a local coordinate system. Here, the local coordinate system is a coordinate system that can be applied to the respective cluster meshes in different manners. For example, if the size of a cluster mesh in a local coordinate system is set to 30 in x-axis direction, 60 in y-axis direction, and 90 in z-axis direction, the scaling of x, y, and z-axes in the local coordinate system is defined to have lengths of 30, 60, and 90, and the number of bits for expressing the length may differ.

The quantization changes continuously changeable values to discrete values, and in an embodiment, it denotes generation of quantized data by converting real number values into integer values. The positions of vertexes of the respective meshes included in the cluster mesh are expressed by real numbers to require a large number of bits, but the number of bits can be reduced by converting the real number values into integer values through the quantization. By reducing the number of bits required for data storage, the accuracy of information is lowered, but approximated information can be expressed with a small amount of data. In other words, by reducing the number of bits, data can be compressed.

Accordingly, the local quantization unit effectively quantizes the respective vertex positions in respective local coordinate systems in accordance with the respective cluster meshes. For example, in the case of attempting the quantization in an absolute coordinate system without local quantization, a relatively large number of bits are required in displaying or storing geometry information of the respective vertexes that are far apart from the original point of the absolute coordinate system. On the other hand, if the number of bits for expressing the coordinates of the vertexes at respective axes is fixed, a big error may occur in displaying or storing geometry information of the respective vertexes located at long distances from the original point.

By contrast, in an embodiment, since respective local coordinate systems are applied to the respective cluster meshes, the respective vertexes included in the cluster meshes are located at shorter distances from the original points of the respective local coordinate systems in comparison to the original point of the absolute coordinate system, and thus the positions of the respective vertexes can be expressed more accurately even with a small number of bits.

The quantized data storage unit 140 stores the coordinates of the respective vertexes in the local coordinate system. The quantized data storage unit 140 may store the range of the local coordinate system and the position of the original point of the local coordinate system in a general storage medium, in addition to the local coordinates of the respective vertexes. Here, the position of the original point in the local coordinate system is the coordinate point from the original point in the absolute coordinate system, and is also the start point of the local coordinate system. Accordingly, in decoding the absolute coordinates of the respective vertexes, the positions of the respective vertexes in the absolute coordinate system can be obtained by adding the local coordinates of the respective vertexes to the position of the original point of the local coordinate system.

As described above, by using the cluster mesh obtained through the clustering of the respective meshes in the three-dimensional mesh model, vertex data in the three-dimensional mesh model can be easily compressed. In addition, by introducing local coordinate systems to the respective cluster meshes, the vertex positions can be accurately expressed with a small number of bits through quantization of geometry information of vertexes included in the respective cluster meshes. Accordingly, the compression ratio of vertex data of the respective vertexes constituting the three-dimensional mesh model can be heightened, and accurate geometry information of the respective vertexes in the three-dimensional mesh model can be stored.

The system 100 for compressing and decoding mesh data in the three-dimensional mesh model may further include a mesh model decoding unit 150. The mesh model decoding unit 150 decodes the quantized data and outputs the decoded data to an output display screen. The mesh model decoding unit 150 may be a graphic processing device. The mesh model decoding unit 150, considering the original point of the local coordinate system as a start point, calculates and adds to the start point the position coordinates of the vertexes quantized based on the local coordinate system. After the position coordinates of the respective vertexes quantized based on the local coordinate system are converted into values in the absolute coordinate system, the positions of the vertexes in the absolute coordinate system are decoded in consideration of the original point of the local coordinate system as the start point.

The addition or multiplication as described above may be performed by hardware taking charge of graphics in addition to a CPU of a general server, a computer, or a mobile device.

Accordingly, the data decoding unit 150 expresses the positions of the respective vertexes included in the respective cluster meshes by using the quantized data in the local coordinate system, and thus the geometric error of the respective cluster meshes being displayed on the output screen can be lowered. Also, by decoding the vertex positions in the three-dimensional mesh model through simple addition or multiplication, the three-dimensional mesh model can be decoded with a small amount of computation. In addition, a portable device or a mobile device, which has somewhat low operation capability, can receive and decode the quantized data in real time.

On the other hand, the mesh model decoding unit 150 may further include a rendering unit (not illustrated) that softly processes the respective vertexes after the positions of the respective vertexes are decoded using the quantized data. Accordingly, the decoded three-dimensional mesh model can be softly processed by finely changing the positions of the respective vertexes expressed by real numbers by using a vertex shader after the positions of the vertexes are decoded.

Figure 4:
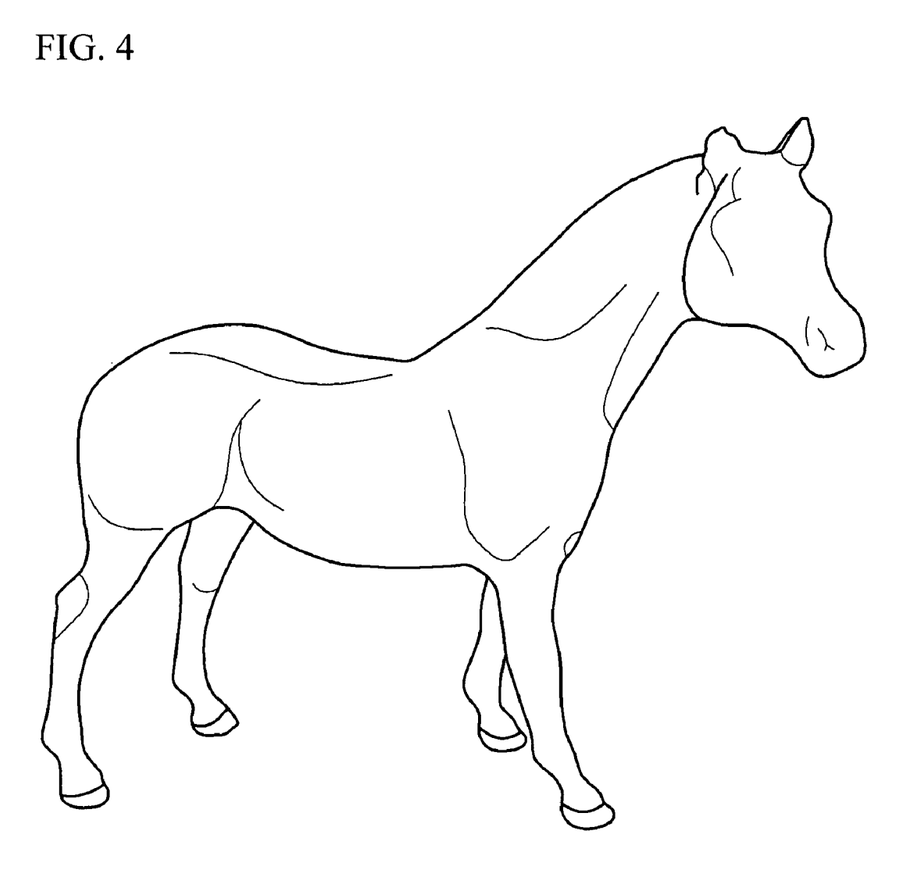
FIG. 4 is a view illustrating an original mesh model before it is compressed by a system for compressing and decoding three-dimensional mesh data according to an embodiment.

FIG. 4 is a view illustrating an original mesh model before it is compressed by a system for compressing and decoding three-dimensional mesh data according to an embodiment.

Referring to FIG. 4, a three-dimensional mesh model of a horse shape is composed of several tens to several ten thousands of meshes constituting the horse shape. The mesh model of FIG. 4, in the similar manner to the mesh model as illustrated in FIG. 1, forms a horse shape by using a plurality of meshes each of which includes a face in the form of a triangle and vertexes located at vertexes of the triangle. In FIG. 4, however, rendering is performed with respect to the mesh model to form soft surfaces, and thus the respective meshes are not shown.

The positions of the respective vertexes that form the three-dimensional mesh model are indicated as geometry information on the absolute coordinate system, i.e., as coordinate values on three orthogonal axes. Accordingly, the mesh data acquisition unit 110 acquires mesh data of the respective meshes or geometry information of the respective vertexes from the generated three-dimensional mesh model.

Figure 5:
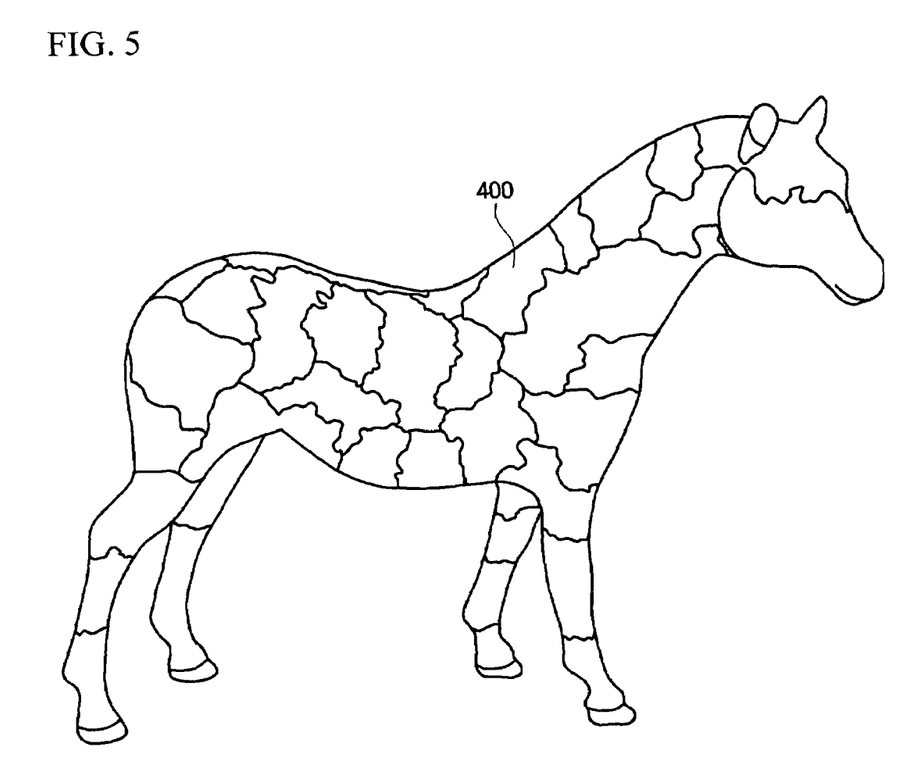
FIG. 5 is a view illustrating an example of cluster mesh generation performed by a system for compressing and decoding three-dimensional mesh data according to an embodiment.

FIG. 5 is a view illustrating an example of cluster mesh generation performed by a system for compressing and decoding three-dimensional mesh data according to an embodiment.

Referring to FIG. 5, the three-dimensional mesh model of a horse shape is divided into a plurality of cluster meshes 400. The geometry information of the respective vertexes is acquired from the three-dimensional mesh mode, and the cluster meshes are generated by combining the vertexes in the three-dimensional mesh model. Here, the cluster mesh is a mesh generated by combining the meshes in order to express the geometry information of neighboring meshes in one local coordinate system.

The cluster mesh is generated in accordance with two following rules.

First, the sizes of the generated cluster meshes are made uniform as much as possible. Here, the size denotes a volume or an area occupied by the generated cluster mesh. If a plurality of cluster meshes are generated, they are arranged to have a uniform distribution in volume or area. Accordingly, by applying almost an equal scaling of the local coordinate system to the respective cluster meshes, good quality quantification can be acquired even with a small number of bits when the respective vertex positions are quantized.

Second, the size of the cluster mesh having the largest size among the generated cluster meshes is minimized. By reducing the size of the cluster mesh having the largest volume or area when the cluster meshes having various volumes or areas are generated, the relative differences between the largest cluster mesh and other cluster meshes can be reduced.

Accordingly, when the scaling of the local coordinate system is performed based on the cluster mesh having the maximum size, the scaling of the local coordinate system for the cluster mesh having the maximum size can also be applied to other cluster meshes as it is. This is because the cluster mesh having the maximum size is larger than other cluster meshes, and thus the sizes of other cluster meshes can be included in the generated scaling range.

Accordingly, as the sizes of the cluster meshes are adjusted by repeated iteration so that the generated cluster meshes have a uniform size, a plurality of cluster meshes 400 are generated as shown in FIG. 5. On the other hand, the number of meshes constituting the initial cluster mesh may be calculated based on the mesh data or geometry information of vertexes acquired from the three-dimensional mesh model, or the number of meshes constituting the initial cluster mesh may be inputted from a user. Here, the initial cluster mesh denotes a cluster mesh that is initially divided in accordance with the number of meshes simply, and by repeated iteration that matches the above-described rules, the cluster meshes having a uniform distribution can be generated.

Figure 6:
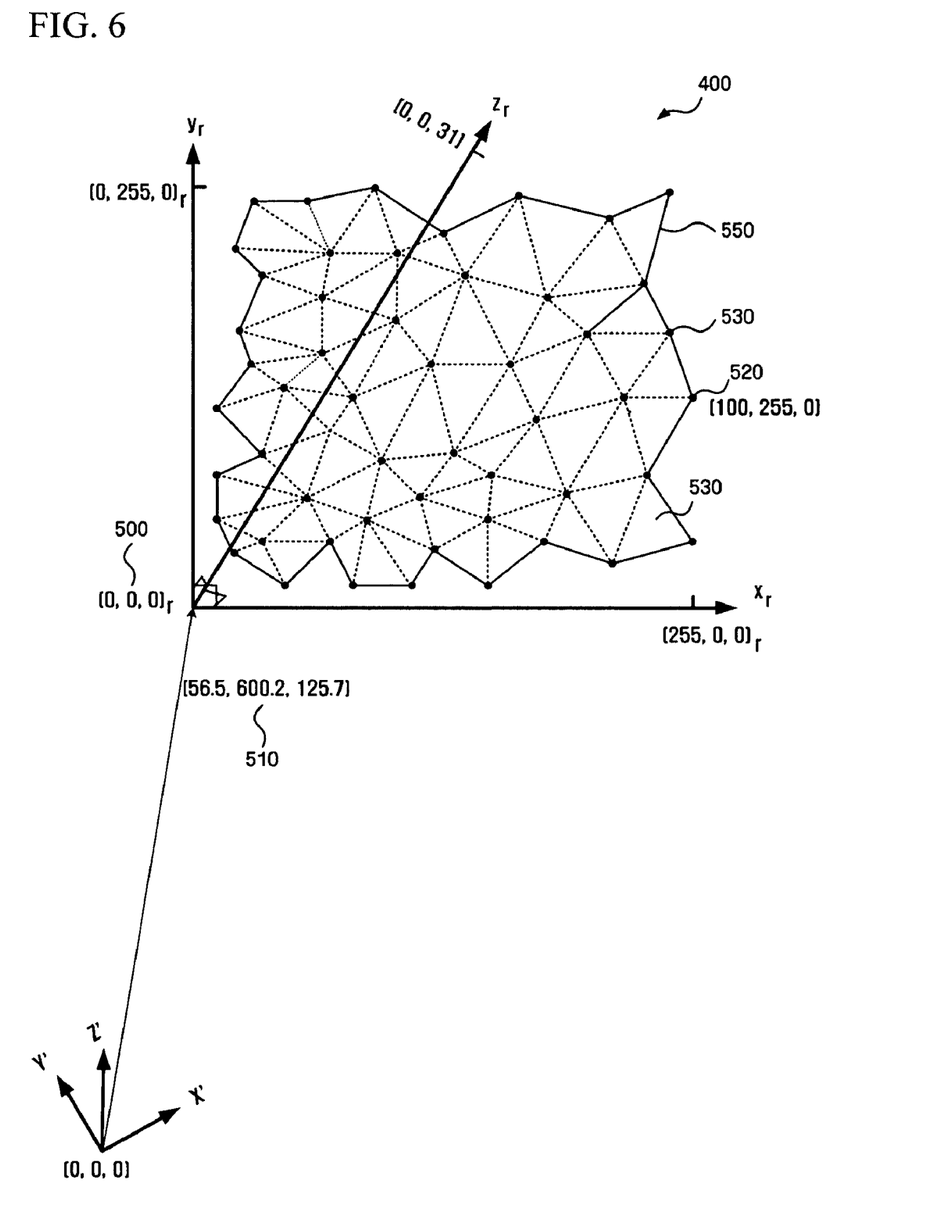
FIG. 6 is a view explaining local quantization of cluster meshes performed by a system for compressing and decoding three-dimensional mesh data according to an embodiment.

FIG. 6 is a view explaining local quantization of cluster meshes performed by a system for compressing and decoding three-dimensional mesh data according to an embodiment.

Referring to FIG. 6, a local quantization is preformed with respect to a certain cluster mesh 400 of FIG. 5. The cluster mesh is a mesh set including a plurality of meshes 530, and has a boundary with other cluster meshes as indicated as solid lines. Since the cluster mesh includes a plurality of meshes, it includes a plurality of vertexes 510 and 520.

The local quantization denotes calculation of geometry information of the vertexes 510 and 520 included in the cluster mesh based on a local coordinate system. For example, the positions of the respective vertexes of the cluster mesh can be indicated based on the local coordinate system. Since the cluster mesh is a mesh set properly formed so that the local quantization can be performed in the local coordinate system, the local coordinate system can perform quantization of the positions of the vertexes included in the cluster mesh with a specified number of bits. For example, as shown in FIG. 6, the positions of the respective vertexes can be indicated by taking 8 bits for $x_r$-axis and $y_r$-axis and taking 6 bits for $z_r$-axis of the local coordinate system. As described above, the positions of the respective vertexes in the local coordinate system can be generated by using unequal number of bits for each axis of the local coordinate system. In addition, the positions of the vertexes can be quantized into real number values in accordance with the number of bits. For example, if a certain vertex 520 has a real number value of $(100.1, 254.8, 0.3)_r$ based on the local coordinate system, it can be quantized into $(100, 255, 0)_r$.

On the other hand, the actual position of the cluster mesh based on the absolute coordinate system is obtained by adding the position in the local coordinate system to the position 510 of the original point 500 of the local coordinate system in the absolute coordinate system. At this time, the positions of the respective vertexes in the local coordinate system may be added to the position 510 of the original point of the local coordinate system after they are multiplied by a transformation matrix for rotating the positions of the respective vertexes based on the absolute coordinate system. In the case of performing the quantization by using the absolute coordinate system without applying the local coordinate system, a larger number of bits are required in quantizing the positions of the respective vertexes. If the number of bits is reduced, the accuracy of the vertex positions through the quantization may be lowered.

Accordingly, in an embodiment, the geometry information of the respective vertexes included in the cluster mesh can be efficiently quantized even with a small number of bits through the local quantification. Also, in decoding the quantized geometry information of the respective vertexes, the positions of the respective vertexes in the absolute coordinate system can be decoded through a simple operation by adding the positions of the respective vertexes in the local coordinate system to the position of the original point in the local coordinate system.

Figure 7:
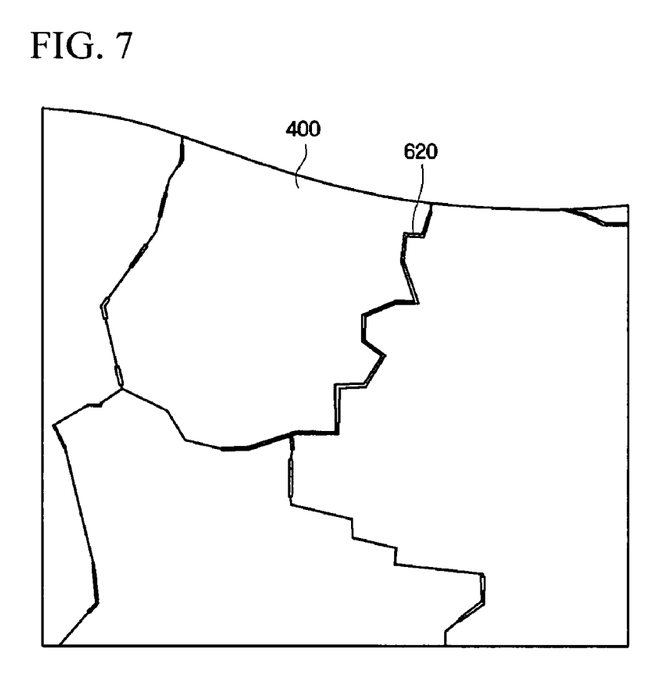
FIG. 7 is a view explaining decoding of cluster meshes performed by a system for compressing and decoding three-dimensional mesh data according to an embodiment.
Figure 8:
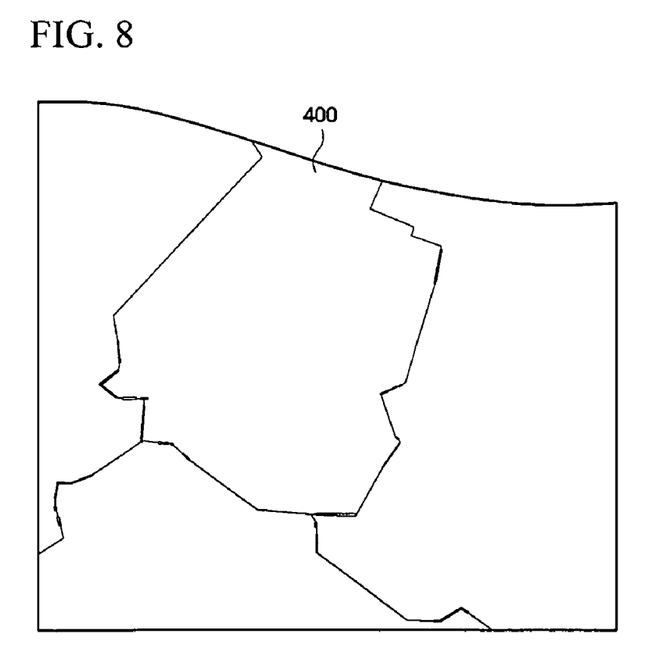
FIG. 8 is a view explaining decoding of cluster meshes performed by a system for compressing and decoding three-dimensional mesh data according to an embodiment.

FIG. 7 is a view explaining decoding of cluster meshes performed by a system for compressing and decoding three-dimensional mesh data according to an embodiment, and FIG. 8 is a view explaining decoding of cluster meshes performed by a system for compressing and decoding three-dimensional mesh data according to another embodiment.

FIG. 7 shows a part of a three-dimensional mesh model after cluster meshes are generated from the three-dimensional mesh model of FIG. 5 and stored data of the respective vertexes are decoded through the local quantization. By quantizing the positions of the respective vertexes of the cluster mesh in the local coordinate system through the local quantization, the positions of the respective vertexes in the cluster mesh can be decoded. However, on the boundary of the respective cluster meshes, the positions of the vertexes in the absolute coordinate system may differ due to the local quantization of the respective cluster meshes in the respective local coordinate systems. Accordingly, as shown in FIG. 7, a gap 620 may appear on the boundary between the cluster meshes.

On the other hand, referring to FIG. 8, the gap on the boundary between the cluster meshes almost disappear. When the local quantization unit 130 quantizes the respective cluster meshes in the local coordinate system, the scaling of the local coordinate system applied to the largest cluster mesh is applied to the local coordinate systems of the remaining cluster meshes. Accordingly, the positions of the respective vertexes included in the respective cluster meshes are determined based the respective local coordinate systems through the same scaling. Here, the same scaling denotes the same application of the number of bits, which indicates the position on the respective axes in the local coordinate system, to all the cluster meshes.

In addition, the positions of the original points in the respective local coordinate systems may be arranged on a quantization grid based on the original point in the absolute coordinate system. Accordingly, the original point in the local coordinate system, which is the start point of the respective cluster meshes, is located on the point indicated as the integer from the original point in the absolute coordinate system, and thus the inconsistency of the respective vertexes in accordance with the positions in the local coordinate system, which may occur due to the quantization, can be prevented.

As described above, by applying the same scaling of the local coordinate system to the respective cluster meshes and positioning the original points in the respective local coordinate systems to match the quantization grid, the gap appearing on the boundary part of the respective cluster meshes can be reduced or removed.

Figure 9:
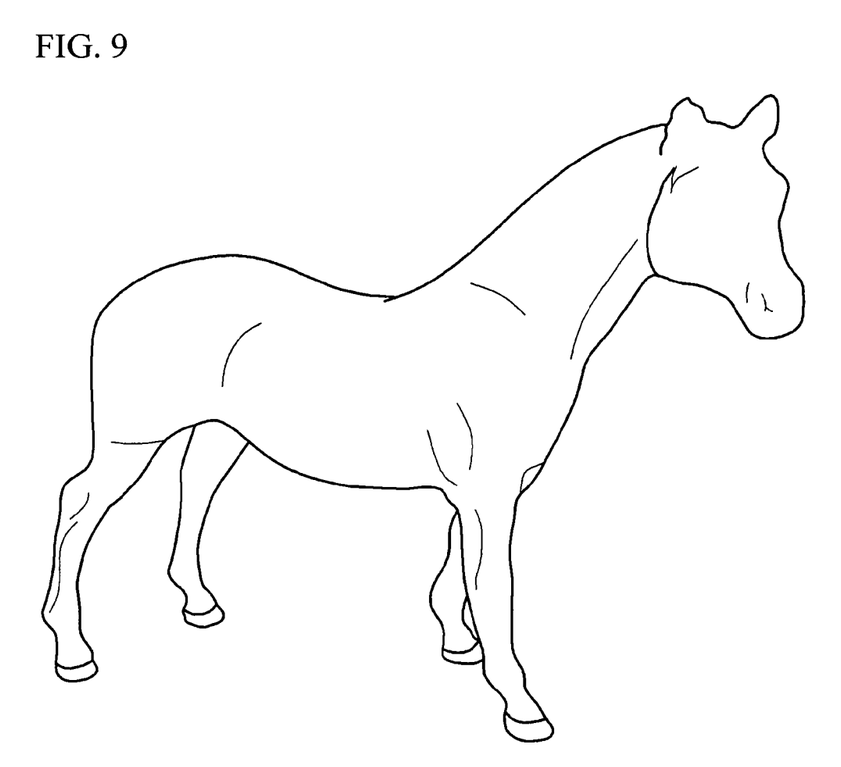
FIG. 9 is a view illustrating an example of cluster mesh decoding performed by a system for compressing and decoding three-dimensional mesh data according to an embodiment.

FIG. 9 is a view illustrating an example of cluster mesh decoding performed by a system for compressing and decoding three-dimensional mesh data according to an embodiment.

The original three-dimensional mesh model is illustrated in FIG. 4. Referring to FIG. 9, the three-dimensional mesh model similar to that of FIG. 4 can be decoded. Accordingly, the system for compressing and decoding the three-dimensional mesh data according to an embodiment divides the three-dimensional mesh model into a plurality of cluster meshes, performs a local quantization of the respective cluster meshes to store the quantized cluster meshes, and decodes the three-dimensional mesh model through a simple operation. Also, in an embodiment, although the respective vertex positions of the original model are compressed through the quantization, the respective vertex positions of the original model can be accurately decoded, and thus the three-dimensional mesh model that is similar to the original model can be decoded.

Figure 10:
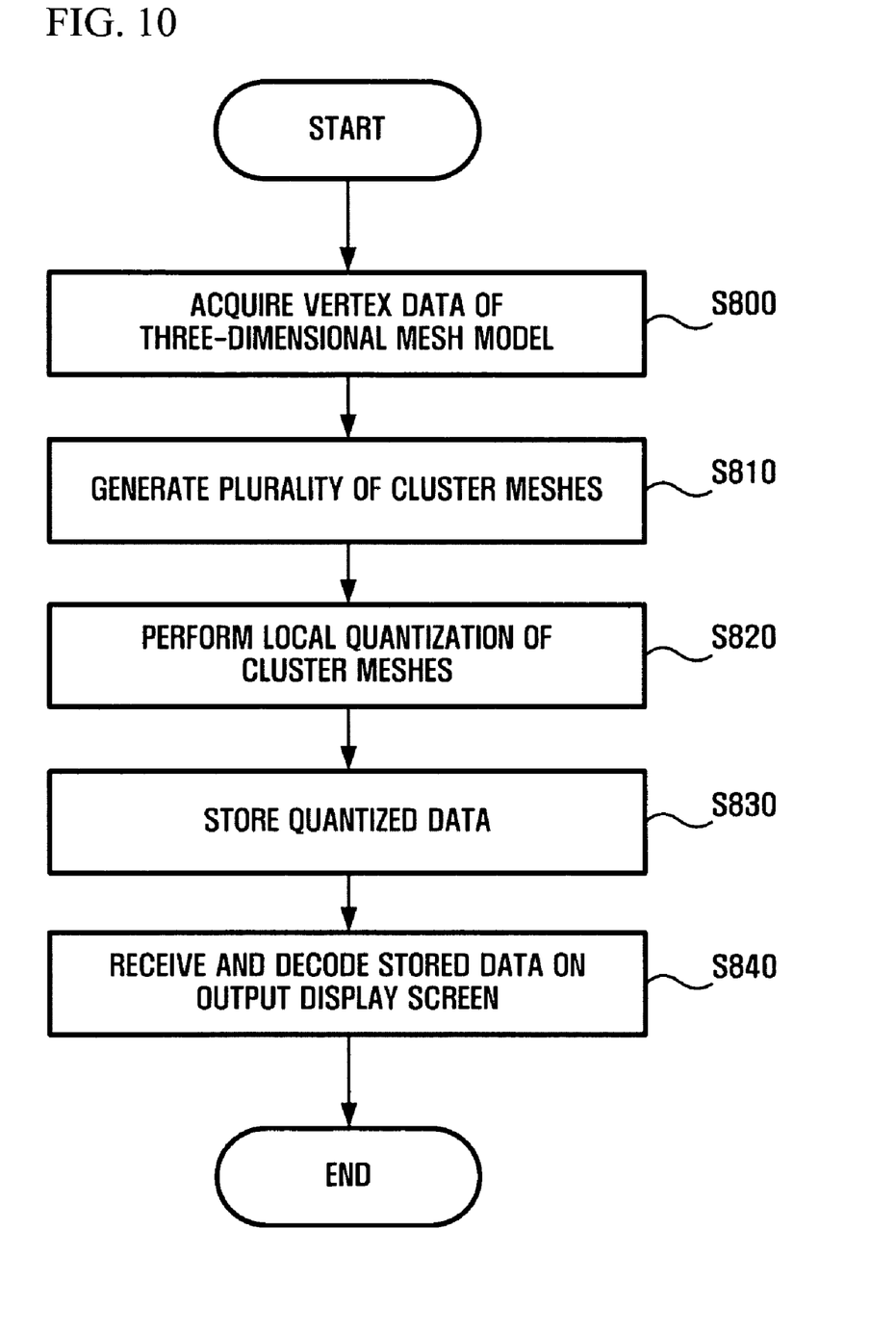
FIG. 10 is a flowchart illustrating a method of compressing and decoding three-dimensional mesh data according to an embodiment.

FIG. 10 is a flowchart illustrating a method of compressing and decoding three-dimensional mesh data according to an embodiment.

Referring to FIG. 10, the mesh data acquisition unit 110 first acquires mesh data from a three-dimensional mesh model S800. The three-dimensional mesh model can be generated by three-dimensional scanning or three-dimensional shape modeling. The generated three-dimensional mesh model is composed of several hundreds to several ten thousands of meshes, and mesh data of such meshes is acquired. Here, the mesh data may include geometry information of respective vertexes of the three-dimensional mesh model, or face, vertex, and edge information of the respective meshes.

The cluster mesh generation unit 120 generates a plurality of cluster meshes by using the acquired mesh data S810. The cluster mesh is a mesh set composed of neighboring meshes and capable of indicating positions of respective vertexes by a specified local coordinate system. The cluster mesh is generated from the three-dimensional mesh model in accordance with two following rules. First, the sizes of the generated cluster meshes are made uniform as much as possible. Second, the size of the cluster mesh having the largest size among the generated cluster meshes is minimized. Here, the size denotes a volume or an area occupied by the generated cluster mesh.

If the cluster meshes are generated, the local quantization unit 130 performs a local quantization of the respective cluster meshes based on the local coordinate system S820. Here, the local quantization is to express the geometry information of the respective vertexes included in the cluster mesh with integer values in the local coordinate system. Accordingly, quantized data is generated by converting the positions of the respective vertexes indicated by real number values into integer values based on the local coordinate system. At this time, the local coordinate system based on the same scaling can be applied to all the cluster meshes by using the scaling of the local coordinate system for the cluster mesh having the largest size among the generated cluster meshes as the scaling of the local coordinate system for other cluster meshes. In addition, the positions of the original points in the respective local coordinate systems are arranged on the quantization grid in the absolute coordinate system, and thus the positional errors of the respective vertexes which may occur depending on the position of the local coordinate system can be reduced.

If the local quantization is performed, the quantized data storage unit 140 stores the quantized data S830. In addition to the quantized data, the quantized data storage unit 140 stores the coordinates of the original point in the local coordinate system for the cluster mesh, which correspond to the coordinate point from the original point in the absolute coordinate system. By storing the quantized data, the data of the three-dimensional mesh model can be compressed with a small number of bits.

In order to decode the three-dimensional mesh model on an output display screen, the mesh model decoding unit receives the quantized data and decodes the positions of the respective vertexes S840. The decoding of the positions of the respective vertexes in the three-dimensional mesh model can be performed with respect to the respective cluster meshes by using the quantized data. After the position of the original point in the local coordinate system is acquired for a specified cluster mesh, the positions of the respective vertexes included in the cluster mesh in the local coordinate system are transformed into the positions in the absolute coordinate system by a transformation matrix, and the transformed positions are added to the position of the original point in the local coordinate system to decode the positions of the corresponding vertexes. By decoding the positions of the respective vertexes through simple addition and multiplication, even a portable phone or a portable device, which has a low-capacity main storage device, can receive and decode the three-dimensional mesh model in real time.

On the other hand, after the quantized data is transferred through a network, a mesh model decoding unit 150 of another network device or portable device can decode the positions of the respective vertexes. The mesh model decoding unit 150 may be a graphic processing unit (not illustrated) of the network device or portable device having an output display screen, which may decode the positions of the respective vertexes through the addition and matrix multiplication.

As described above, according to embodiments, geometry data of respective vertexes can be compressed and decoded by using cluster meshes in a three-dimensional mesh model.

In addition, as the geometry data of the respective vertexes is compressed with a small number of bits and then stored, the geometry data of the respective vertexes can be accurately quantized and stored.

In addition, the geometry information of the respective vertexes can be decoded in real time by decoding the geometry information of the respective vertexes through a simple operation.

Although a few embodiments have been shown and described, it would be appreciated by those skilled in the art that changes may be made in these embodiments, the scope of which is defined in the claims and their equivalents.

What is claimed is:

1. A system for compressing and decoding mesh data in a three-dimensional mesh model, comprising:
    a mesh data acquisition unit to acquire mesh data from a three-dimensional mesh model;
    a cluster mesh generation unit to generate a plurality of cluster meshes by using the mesh data; and
    a local quantization unit, using at least one processor, to quantize geometry information of respective vertexes through application of respective local coordinate systems to the respective cluster meshes and to generate quantized data of the respective vertexes included in the respective cluster meshes,
    wherein the quantization of geometric information causes gaps in some of the cluster meshes, and
    wherein the local quantization unit performs a scaling of a grid of the local coordinate system to suit the cluster mesh having the largest size among the generated cluster meshes, and applies the local coordinate system adopting the same scaling to other cluster meshes to reduce the gaps caused by quantization of the geometric information.

2. The system of claim 1, further comprising a quantized data storage unit to store the quantized data of the respective vertexes.

3. The system of claim 2, wherein the quantized data storage unit expresses a position of an original point of the local coordinate system for the respective cluster meshes as coordinates in an absolute coordinate system, and stores the position of the original point together with the quantized data.

4. The system of claim 1, further comprising a mesh model decoding unit to decode positions of the respective vertexes by using the quantized data of the respective vertexes and a position of an original point of the local coordinate system in an absolute coordinate system.

5. The system of claim 4, wherein the mesh model decoding unit receives the quantized data of the respective vertexes through a wire or wireless network and decodes the positions of the respective vertexes.

6. The system of claim 5, wherein the mesh model decoding unit comprises a rendering unit to control the positions of the respective vertexes after decoding the positions of the respective vertexes by using the quantized data of the respective vertexes.

7. The system of claim 1, wherein the cluster mesh generation unit generates a set of neighboring meshes among a plurality of meshes constituting the three-dimensional mesh model as the cluster mesh, and controls sizes of the cluster meshes by minimizing a size of the cluster mesh having a maximum size among the generated cluster meshes.

8. The system of claim 7, wherein the size corresponds to a volume or an area of the cluster mesh.

9. The system of claim 1, wherein the local quantization unit positions an original point of the local coordinate system on a quantization grid in an absolute coordinate system.

10. The system of claim 1, wherein the mesh data includes geometry information of the respective vertexes constituting the three-dimensional mesh model in an absolute coordinate system.

11. The system of claim 1, further comprising a mesh model decoding unit to decode positions of the respective vertexes by using the quantized data of the respective vertexes and a position of an original point of the local coordinate system in an absolute coordinate system,
    wherein the position of the original point of respective cluster meshes is a start point; and
    wherein the mesh model decoding unit calculates and adds to the respective start point position coordinates of vertexes quantized based on the respective local coordinate systems in order to convert the respective position coordinates of vertexes into absolute coordinate positions of vertexes.

12. A method of compressing and decoding mesh data in a three-dimensional mesh model, comprising:
    acquiring mesh data from a three-dimensional mesh model;
    generating a plurality of cluster meshes by using the mesh data; and
    quantizing geometry information of respective vertexes through application of respective local coordinate systems to the respective cluster meshes and generating quantized data of the respective vertexes included in the respective cluster meshes,
    wherein the quantization of geometric information causes gaps in some of the cluster meshes,
    wherein the quantizing operation further comprises performing a scaling of a grid of the local coordinate system to suit the cluster mesh having the largest size among the generated cluster meshes, and applying the local coordinate system adopting the same scaling to other cluster meshes to reduce the gaps caused by the quantizing of geometric information, and wherein the method is performed using at least one processor.

13. The method of claim 12, further comprising storing the quantized data of the respective vertexes.

14. The method of claim 13, wherein the quantizing comprises expressing a position of an original point of the local coordinate system for the respective cluster meshes as coordinates in an absolute coordinate system, and storing the position of the original point together with the quantized data.

15. The method of claim 12, further comprising decoding positions of the respective vertexes by using the quantized data of the respective vertexes and a position of an original point of the local coordinate system in an absolute coordinate system.

16. The method of claim 15, wherein the decoding comprises receiving the quantized data of the respective vertexes through a wire or wireless network and decoding the positions of the respective vertexes.

17. The method of claim 16, wherein the decoding further comprises controlling the positions of the respective vertexes after decoding the positions of the respective vertexes by using the quantized data of the respective vertexes.

18. The method of claim 12, wherein the generating comprises:
generating a set of neighboring meshes among a plurality of meshes constituting the three-dimensional mesh model as the cluster mesh; and
controlling sizes of the cluster meshes by minimizing a size of the cluster mesh having a maximum size among the generated cluster meshes.

19. The method of claim 18, wherein the size corresponds to a volume or an area of the cluster mesh.

20. The method of claim 12, wherein the quantizing comprises positioning an original point of the local coordinate system on a quantization grid in an absolute coordinate system.

21. The method of claim 12, further comprising decoding positions of the respective vertexes by using the quantized data of the respective vertexes and a position of an original point of the local coordinate system in an absolute coordinate system,
wherein the position of the original point is a start point; and
wherein the decoding of positions of the respective vertexes includes calculating and adding to the respective start point position coordinates of vertexes quantized based on the respective local coordinate system in order to convert the respective position coordinates of vertexes into absolute coordinate positions of vertexes.

22. At least one non-transitory computer readable medium storing instructions that control at least one processor to implement the method of claim 12.

* * * * *

UNITED STATES PATENT AND TRADEMARK OFFICE
CERTIFICATE OF CORRECTION

| | |
|---|---|
| PATENT NO. | : 8,310,480 B2 |
| APPLICATION NO. | : 12/320068 |
| DATED | : November 13, 2012 |
| INVENTOR(S) | : Ho-Kyung Kim et al. |

It is certified that error appears in the above-identified patent and that said Letters Patent is hereby corrected as shown below:

Title Page, Column 2 (Other Publications); Line 1; Delete "Compresison" and insert
    -- Compression --, therefor.

Signed and Sealed this
Fourteenth Day of May, 2013

Teresa Stanek Rea
*Acting Director of the United States Patent and Trademark Office*